United States Patent
Waxman

(10) Patent No.: US 7,664,085 B2
(45) Date of Patent: Feb. 16, 2010

(54) WIRELESS COMMUNICATION DEVICE AND METHOD FOR COORDINATING COMMUNICATIONS AMONG WIRELESS LOCAL AREA NETWORKS (WLANS) AND BROADBAND WIRELESS ACCESS (BWA) NETWORKS

(75) Inventor: Shai Waxman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 775 days.

(21) Appl. No.: 11/322,465

(22) Filed: Dec. 30, 2005

(65) Prior Publication Data

US 2007/0153749 A1   Jul. 5, 2007

(51) Int. Cl.
*H04W 4/00* (2009.01)
*H04J 1/16* (2006.01)
*H04J 3/16* (2006.01)

(52) U.S. Cl. .................. 370/338; 370/230; 370/466
(58) Field of Classification Search .................. 370/338
See application file for complete search history.

(56) References Cited

U.S. PATENT DOCUMENTS

| 2003/0147368 | A1  | 8/2003  | Eitan et al. |
| 2005/0255877 | A1  | 11/2005 | Fuccello et al. |
| 2007/0025246 | A1* | 2/2007  | Pirzada et al. ............... 370/230 |

2007/0080781 A1   4/2007  Ginzburg et al.

FOREIGN PATENT DOCUMENTS

WO   WO-2007078884 A1   7/2007

OTHER PUBLICATIONS

European Application Serial No. 06845621.9, Office Action mailed Nov. 4, 2008, 24 pgs.
Waxman, Shay, "Wireless Communication Device and Method for Coordinating Communications Among Wireless Local Area Networks (WLANs) and Broadband Wireless Access (BWA) Network", U.S. Appl. No. 11/322,465, filed Dec. 30, 2005.

* cited by examiner

*Primary Examiner*—Vincent P Harper
*Assistant Examiner*—Timothy Pham
(74) *Attorney, Agent, or Firm*—Schwegman, Lundberg & Woessner, P.A.; Gregory J. Gorrie

(57) ABSTRACT

Embodiments of methods for coordinating communications among wireless networks and a co-located wireless communication device are generally described herein. Other embodiments may be described and claimed. In some embodiments, frame-timing parameters are reported by a broadband wireless access (BWA) network node to a node of a wireless local area network (WLAN), and the WLAN node may transmit the frame-timing parameters to an access point ad the WLAN. The BWA network node and the WLAN node may be co-located within the wireless communication device. The transmission time of downlink transmissions for receipt by the WLAN node may be selected by the access point based on the frame-timing parameters to reduce interference caused by concurrent uplink transmissions by the BWA network node.

21 Claims, 5 Drawing Sheets

WIRELESS COMMUNICATION DEVICE AND METHOD FOR COORDINATING COMMUNICATIONS AMONG WIRELESS LOCAL AREA NETWORKS (WLANS) AND BROADBAND WIRELESS ACCESS (BWA) NETWORKS

TECHNICAL FIELD

The present invention pertains to wireless communications. Some embodiments pertain to wireless networks.

BACKGROUND

Many wireless communication networks operate within the same coverage area and locations as other types of wireless communication networks. These networks should be able to coexist without significant interference from each other. For example, one or more wireless local area networks (WLANs) may operate within a larger geographic region served by a broadband wireless access (BWA) network. Although these networks may use different frequency spectrums, transmissions by devices of one network may cause interference with reception by devices of another network. This may be particularly problematic when the devices are co-located.

Thus there are general needs for methods of coordinating communications among wireless networks, such as BWA networks and WLANs.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, the sequence of operations may vary, and features of some embodiments may be included in or substituted for those of others. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
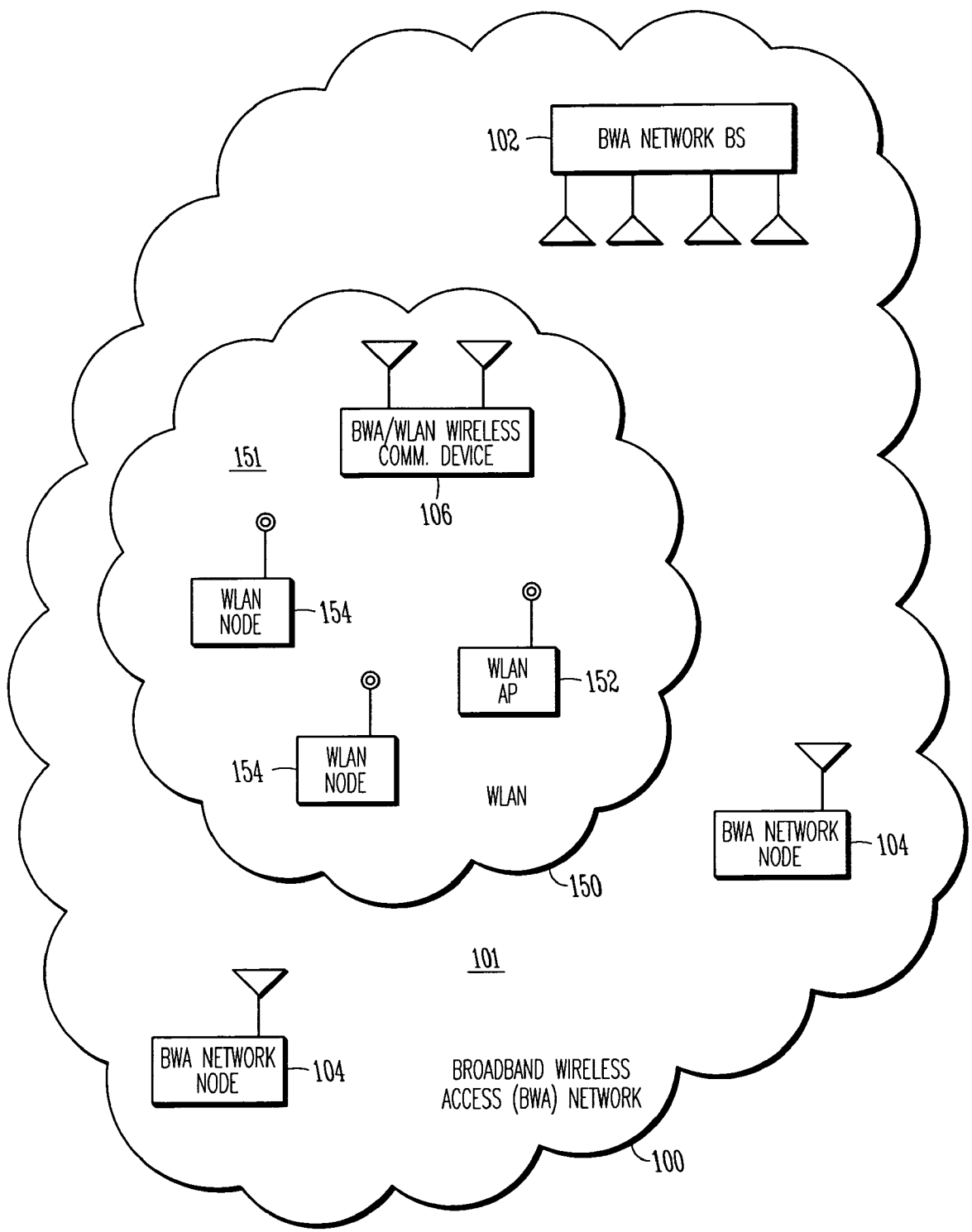
FIG. 1 illustrates the coexistence of wireless networks in accordance with some embodiments of the present invention.

FIG. 1 illustrates the coexistence of wireless networks in accordance with some embodiments of the present invention. The communication environment may include broadband wireless access (BWA) network 100 and one or more wireless local area networks, such as wireless local area network (WLAN) 150. BWA network 100 includes BWA network base station (BS) 102 and one or more BWA network nodes 104. WLAN 150 includes WLAN access point (AP) 152 and one or more WLAN nodes 154. BWA network 100 and WLAN 150 may have overlapping coverage areas. As illustrated, coverage area 151 of WLAN 150 served by WLAN access point 152 may be much smaller than coverage area 101 of BWA network 100 served by BWA network base station 102. As illustrated, coverage area 151 of WLAN 150 may be completely within coverage area 101 of BWA network 100, although the scope of the invention is not limited in this respect.

BWA network 100 and WLAN 150 may include one or more wireless communication devices, such as BWA/WLAN wireless communication device 106, located in coverage area 101 which may be served by both BWA network 100 and WLAN 150. Wireless communication device 106 may communicate with BWA network base station 102 as well as WLAN access point 152. Wireless communication device 106 may include a BWA network node portion and a WLAN node portion. Both BWA network node portion and WLAN node portion may be located together within (i.e., co-located) wireless communication device 106. Examples of this are described in more detail below.

In accordance with some embodiments of the present invention, wireless communication device 106 may operate within both WLAN 150 and BWA network 100 by reporting frame-timing parameters related to BWA network 100 to the WLAN node portion of wireless communication device 106. In these embodiments, wireless communication device 106 may further operate within both WLAN 150 and BWA network 100 by transmitting the frame-timing parameters to access point 152. The transmission time of a downlink transmission for receipt by the WLAN node portion may be selected by access point 152 based on the frame-timing parameters to reduce and possibly help eliminate interference caused by concurrent uplink transmissions to BWA network 100 by the BWA network node portion of wireless communication device 106. These embodiments are described in more detail below.

In some embodiments, BWA network 100 may be a broadband wireless multiple access communication network in which uplink and downlink time-slots are determined by BWA network base station 102 and provided to one or more of BWA network nodes 104 for communicating with BWA network base station 102 in a multiple access manner. WLAN 150, on the other hand, may be a contention-based wireless communication network in which WLAN nodes 154 contend for shared (e.g., the same) bandwidth to communicate with access point 152. In some embodiments, BWA network 100 may communicate using orthogonal frequency division multiplexing (OFDM). In some of these embodiments, BWA network 100 may be a Worldwide Interoperability for Microwave Access (WiMax) network implementing orthogonal frequency division multiple access (OFDMA) communications and/or implementing spread-spectrum communications, BWA base station 102 may be a WiMAX base station, and BWA network nodes 104 may be WiMAX communication stations (STAs), although the scope of the invention is not limited in this respect. In some embodiments, WLAN 150 may be a Wireless Fidelity (WiFi) network implementing a multicarrier communication technique, such as OFDM, and/or by implementing spread spectrum communications.

In some embodiments, the frequency spectrum used by WLAN 150 may comprise either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some embodiments, the frequency spectrum used by BWA network 100 may comprise frequencies between 2 and 11 GHz, although the scope of the invention is not limited in this respect.

In the embodiments that BWA network 100 and/or WLAN 150 communicate using OFDM, the communication signals may comprise a plurality of orthogonal subcarriers. Each subcarrier of the communication signals may have a null at substantially a center frequency of the other subcarriers and/or each subcarrier may have an integer number of cycles within a symbol period, although the scope of the invention is not limited in this respect.

In some embodiments, WLAN nodes 154 and WLAN access point 152 may communicate in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for wireless local area networks (WLANs), although the scope of the invention is not limited in this respect as they may also be suitable to transmit and/or receive communications in accordance with other techniques and standards. In some embodiments, BWA network nodes 104 and BWA network base station 102 may communicate in accordance with the IEEE 802.16-2004 and the IEEE 802.16(e) standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions.

Figure 2:
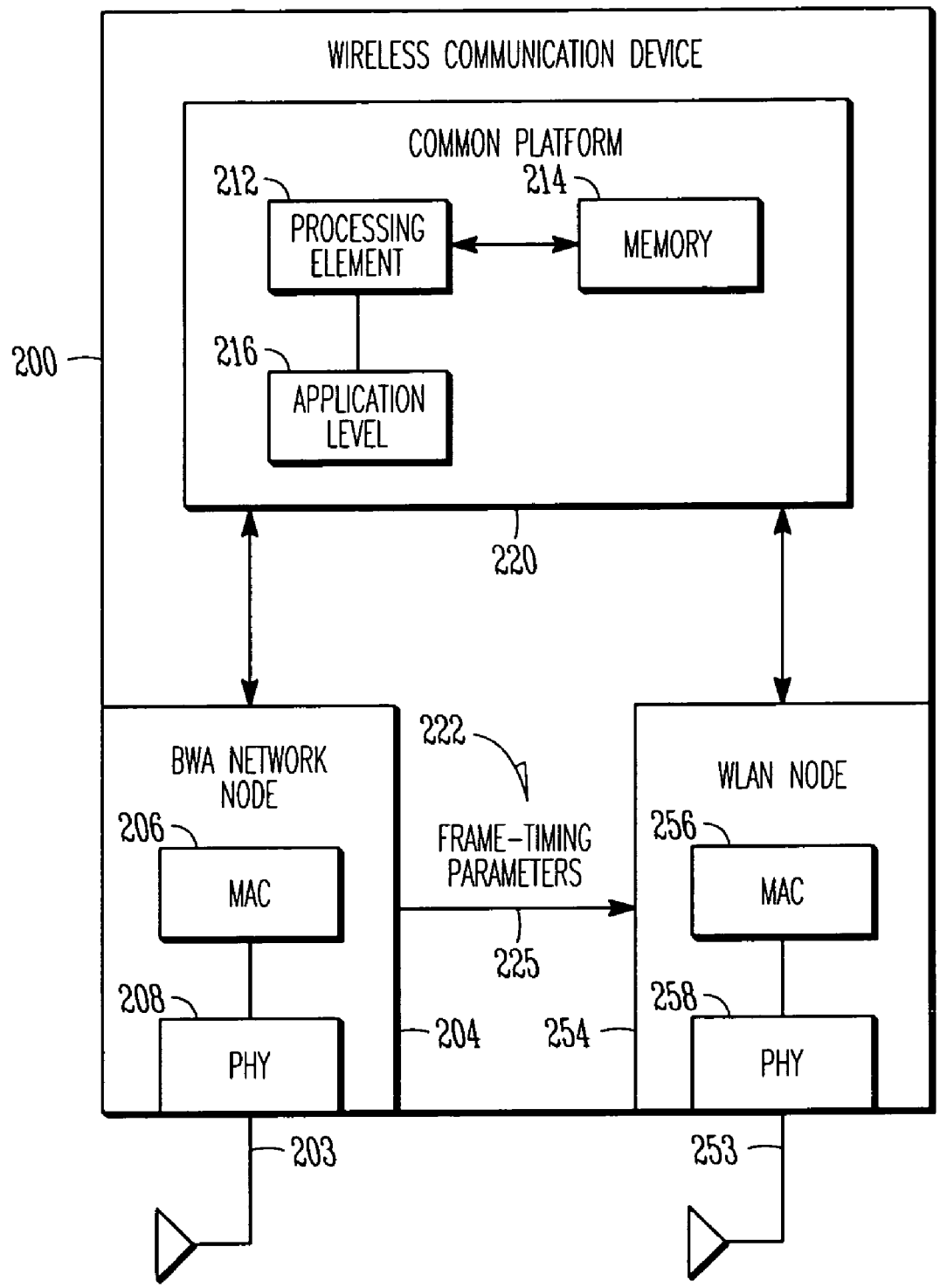
FIG. 2 is a functional block diagram of a wireless communication device with a BWA network node and WLAN node in accordance with some embodiments of the present invention.

FIG. 2 is a functional block diagram of a wireless communication device with a BWA network node and a WLAN node in accordance with some embodiments of the present invention. Wireless communication device 200 may be suitable for use as wireless communication device 106 (FIG. 1), although other configurations may also be suitable. Wireless communication device 200 may include a BWA network node portion, shown as BWA network node 204, and a WLAN node portion, shown as WLAN node 254. BWA network node 204 may be capable of independent communication with BWA network base station 102 (FIG. 1) of BWA network 100 (FIG. 1) and WLAN node 254 may be capable of independent communication with WLAN access point 152 (FIG. 1) of WLAN 150 (FIG. 1). BWA network node 204 and WLAN node 254 may be located together within (i.e., co-located) wireless communication device 200.

Referring to FIGS. 1 and 2 together, in accordance with some embodiments of the present invention, BWA network node 204 may report frame-timing parameters 222 related to BWA network 100 to WLAN node 254, and WLAN node 254 may transmit frame-timing parameters 222 to access point 152. The transmission time of a subsequent downlink transmission for receipt by WLAN node 254 may be selected by access point 152 based on frame-timing parameters 222 as described in detail below to reduce and possibly help eliminate interference caused by concurrent uplink transmissions to BWA network 100 by BWA network node 204. Examples of downlink transmissions by WLAN access point 152 include broadcast transmissions, such as beacon frames, described in more detail below.

Based on the above, the downlink transmission by WLAN access point 152 may be received by WLAN node 254 during times other than uplink transmission times to BWA network base station 102. Accordingly, the uplink transmissions to BWA network base station 102 by BWA network node 204 will not likely interfere with the receipt of signals sent from WLAN access point 152 to WLAN node 254. If concurrent transmission to BWA network base station 102 and reception from WLAN access point 152 were to occur, the power level of the transmitted signals by BWA network node 204 might overwhelm the receiver of WLAN node 254, even when BWA network node 204 and WLAN node 254 may communicate using different frequency ranges. Accordingly, the selection of a proper downlink transmission time by WLAN access point 152 may help improve the ability of WLAN node 254 to receive signals from WLAN access point 152.

In some alternative embodiments, WLAN node 254 may scan for transmissions by BWA network base station 102 to identify, estimate and/or determine frame-timing parameters 222 for the transmissions of BWA network 100. In these alternate embodiments, WLAN node 254 does not have to rely on BWA node 204 to provide this information.

In some embodiments, BWA network node 204 may report frame-timing parameters 222 on a regular basis, while in some other embodiments, BWA network node 204 may report frame-timing parameters 222 whenever they change. In some IEEE 802.16 embodiments, frame timing may remain unchanged; however from time to time the uplink and downlink times may either expand or contract, but the frame start (e.g., the downlink preamble) may remain at fixed predefined time intervals. This may reduce the reporting requirements of frame-timing parameters 222. In some embodiments, WLAN node 254 may receive frame-timing parameters 222 in real-time but may report frame-timing parameters 222 to access point 152 on a regular basis (e.g., every few seconds) and/or when its throughput becomes degraded.

In some embodiments, BWA network node 204 may provide frame-timing parameters 222 to WLAN node 254 over internal communication path 225 of the wireless communication device 200. Internal communication path 225 may be either a hardware-implemented or a software-implemented communication path. In the embodiments when internal communication path 225 is a hardware-implemented communication path, internal communication path 225 may comprise a single on-board hard-wired connection. In the embodiments when internal communication path 225 is a software-implemented communication path, BWA network node 204 and WLAN node 254 may share a common clock and internal communication path 225 may be almost any internal communication path that operates on the common clock.

Although FIG. 2 shows nodes 204 and 254 as co-located in single wireless communication device 106, the scope of the invention is not limited in this respect as node 204 and node 254 may be located in separate wireless communication devices. In some alternate embodiments, nodes 204 and 254 may correspond to network interface cards (NICs) for BWA networks and WLANs respectively. In some other embodiments, nodes 204 and 254 may comprise a single node with functionality for interfacing with both BWA networks and WLANs, although the scope of the invention is not limited in this respect.

As illustrated in FIG. 2, in some embodiments, BWA network node 204 and WLAN node 254 may share a common computing/processing platform, illustrated as common platform 220. Common platform 220 may have one or more processing elements 212, memory 214 and application-level circuitry 216 shared by BWA network node 204 and WLAN node 254. BWA network node 204 and WLAN node 254 may each have separate media-access control (MAC) layer circuitry 206 and 256, physical (PHY) level layer circuitry 208 and 258, and antennas 203 and 253 for communicating respectively with BWA network 100 and WLAN 150, although the scope of the invention is not limited in this respect.

Although wireless communication device 200 is illustrated as having several separate functional elements, one or more of the functional elements may be combined and may be implemented by combinations of software-configured elements, such as processing elements including digital signal processors (DSPs), and/or other hardware elements. For example, some elements, including elements of common platform 220, may comprise one or more microprocessors, DSPs, application specific integrated circuits (ASICs), and combinations of various hardware and logic circuitry for performing at least the functions described herein. In some embodiments, the functional elements of wireless communication device 200 may refer to one or more processes operating on one or more processing elements.

In some embodiments, wireless communication device 200 may be part of a portable wireless communication device, such as personal digital assistant (PDA), a laptop or portable computer with wireless communication capability, a web tablet, a wireless telephone, a wireless headset, a pager, an instant messaging device, a digital camera, an access point, a television or other device that may receive and/or transmit information wirelessly.

Antennas 203 and 253 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used.

Figure 3:
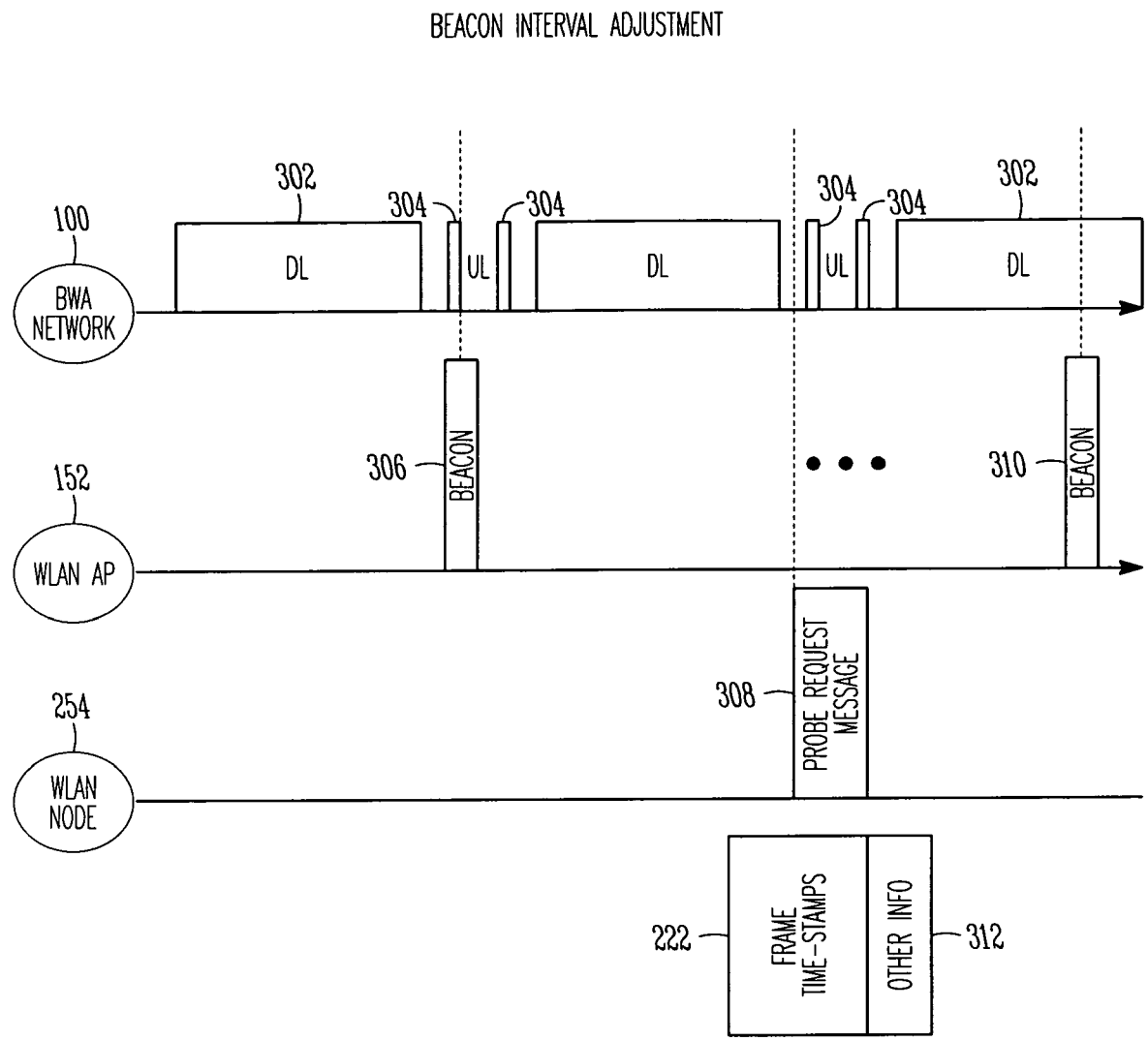
FIGS. 3 and 4 illustrate various communications between nodes of wireless communication networks in accordance with some embodiments of the present invention.
Figure 4:
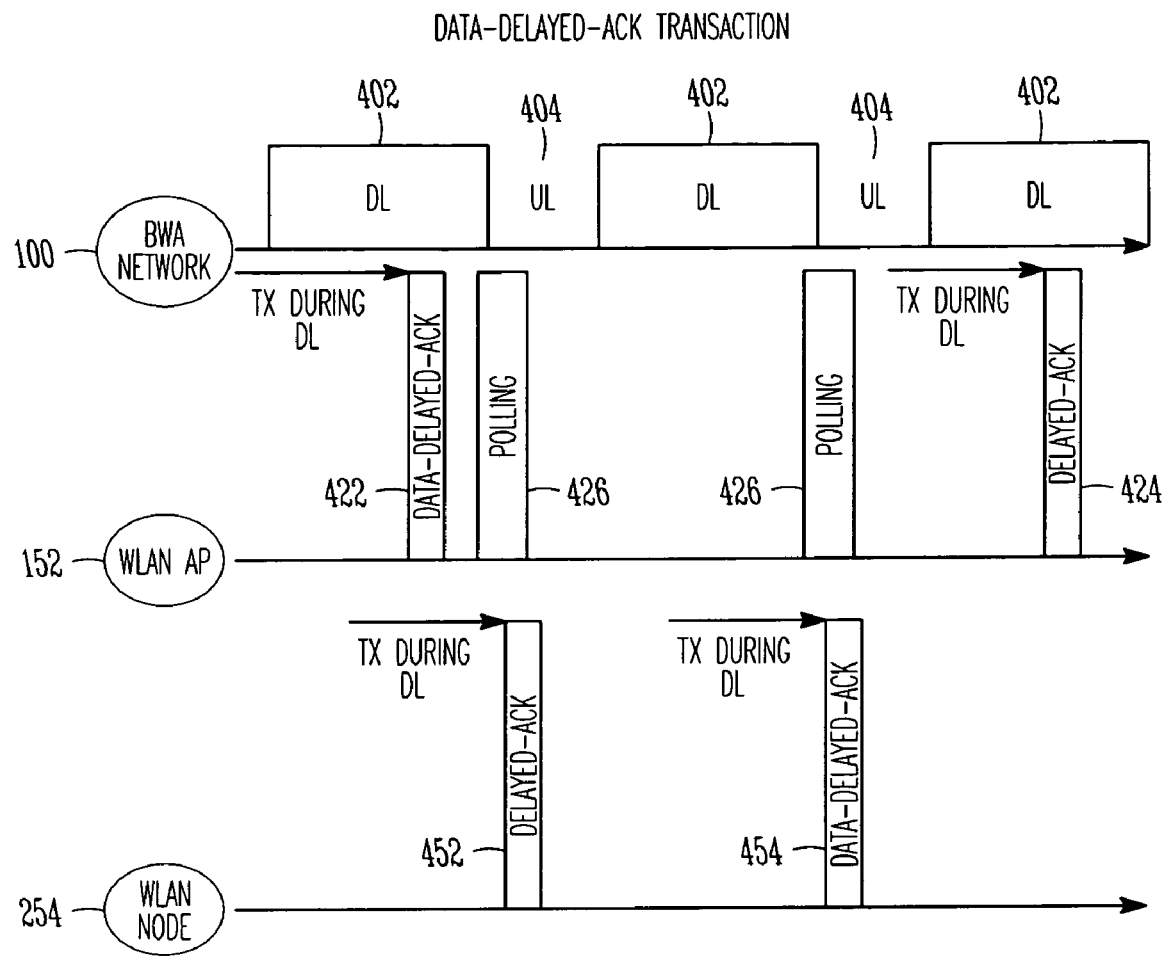

FIGS. 3 and 4 illustrate various communications between nodes of wireless communication networks in accordance with some embodiments of the present invention. In FIG. 3, an example frame structure for a BWA network, such as BWA network 100 (FIG. 1), includes downlink subframes 302 and one or more uplink subframes 304. In BWA network 100 (FIG. 1), BWA network base station 102 (FIG. 1) coordinates communications within BWA network 100 and provides frame-timing parameters 222 to associated BWA network nodes 104 (FIG. 1). BWA network nodes 104 (FIG. 1) receive downlink transmissions during downlink subframes 302 and transmit uplink transmissions during one of uplink subframes 304. Each BWA network node 104 (FIG. 1) may be assigned one of uplink subframes 304 for transmitting to BWA network base station 102 (FIG. 1).

Referring to FIGS. 1 through 3, in some embodiments, WLAN node 254 may transmit frame-timing parameters 222 to access point 152 during a time interval of uplink (UL) subframes 304 of BWA network 100. The time interval of the uplink subframes 304 may be determined from frame-timing parameters 222. In some embodiments, WLAN node 254 transmits frame-timing parameters 222 to access point 152 as part of coexistence probe request message 308. In these embodiments, coexistence probe request message 308 may include other information 312.

In some embodiments, BWA network node 204 may receive frame-timing parameters 222 from BWA network 100 as part of a map provided in the downlink (DL) subframes 302. Frame-timing parameters 222 may include frame-timing information for use by BWA network node 204 in communicating with BWA network 100.

In some embodiments when internal communication path 225 is a hardware-implemented communication path, the hard-wired connection may carry frame-timing parameters 222 as a logical '1' during a downlink to indicate the occurrence of downlink subframe 302 and as a logical '0' during an uplink to indicate the occurrence of one or more of uplink subframes 304. In these embodiments, frame-timing parameters 222 may be sent in real-time to WLAN node 154, although the scope of the invention is not limited in this respect. In some embodiments when internal communication path 225 is a software-implemented communication path, BWA network node 204 may send time-stamp information over internal communication path 225 indicating the start time of downlink subframe 302 and the start time of uplink subframes 304, although the scope of the invention is not limited in this respect.

In some embodiments, frame-timing parameters 222 may comprise at least one of a downlink subframe start time, an uplink subframe start time and a frame end time. In some OFDMA embodiments, frame-timing parameters 222 may include three time-stamps relative to a beginning of an OFDMA frame. An OFDMA frame may comprise a downlink subframe, such as downlink subframe 302, and one or more uplink subframes, such as uplink subframes 304. Examples of downlink and uplink subframes are discussed in more detail below.

In response to receipt of frame-timing parameters 222 from WLAN node 254, in some embodiments, access point 152 may responsively change the transmission time for transmission of at least one or more regularly transmitted downlink transmissions (e.g., a broadcast transmission) to one or more WLAN nodes 154 of WLAN 150 based on frame-timing parameters 222 so that the uplink transmissions to BWA network 100 from one or more BWA network nodes 104 of BWA network 100 are less likely to interfere with the receipt of the one or more regularly transmitted downlink transmissions. Accordingly, an uplink transmission by BWA network node 204 is less likely to interfere with receipt of a downlink transmission by WLAN node 254 because downlink transmissions may be selected to occur during downlink subframe 302.

In some embodiments, a downlink transmission may comprise a regularly transmitted broadcast transmission, such as beacon frame 310, transmitted by access point 152. Beacon frame 310, for example, may be transmitted on a periodic basis to provide communication parameters to one or more WLAN nodes 154 of WLAN 150 for communicating with access point 152. As illustrated in FIG. 3, access point 152 may transmit beacon frame 310 to coincide with downlink subframe 302 of BWA network 100 (e.g., during downlink transmissions by BWA network base station 102).

In FIG. 3, beacon frame 306 is illustrated as potentially colliding with an uplink transmission of wireless communication device 200 during uplink subframe 304 making it difficult, if not impossible, for wireless communication device 200 to receive beacon frame 306. After receipt of frame-timing parameters 222 and the selection of a time for the transmission of downlink transmissions by WLAN access point 152, beacon frame 310 is transmitted during downlink subframe 302 and may more easily be received by wireless communication device 200 because BWA network node 204 will not be scheduled for uplink transmissions during downlink subframe 302.

In FIG. 4, an example frame structure for a BWA network includes downlink subframes 402 and one or more uplink subframes 404. Downlink subframes 402 may correspond to downlink subframes 302 (FIG. 3) and uplink subframes 404 may correspond to uplink subframes 304 (FIG. 3).

Referring to FIGS. 1, 2 and 4 together, in these embodiments, WLAN node 254 may select a time and schedule uplink data transmissions 454 to access point 152 during uplink subframes 404 of BWA network 100 based on frame-timing parameters 222. WLAN node 254 may wait at least a predetermined period of time for receipt of acknowledgement (DELAYED-ACK) 424 from access point 152. Acknowledgement 424 may be scheduled for transmission by access point 152 during a next downlink subframe 402 of BWA network 100 based on frame-timing parameters 222. In some embodiments, the predetermined period of time that WLAN node 254 may wait may comprise one or more uplink subframes 404 and downlink subframe 402. In some embodiments, the predetermined period of time may be approximately an OFDMA frame time comprising one or more OFDMA uplink subframes and an OFDMA downlink subframe, although the scope of the invention is not limited in this respect.

In some embodiments, WLAN access point 152 may select a transmit time for downlink data transmission 422 based on frame-timing parameters 222. WLAN access point 152 may wait at least a predetermined period of time for receipt of acknowledgement 452 transmitted by WLAN node 254. Acknowledgement (DELAYED-ACK) 452 may be scheduled for transmission by WLAN node 254 during the next set of uplink subframes 404 of BWA network 100 based on frame-timing parameters 222. In some embodiments, uplink data transmissions 454 and downlink data transmissions 422 may be referred to as "Data-delayed-ACK" transmissions, and acknowledgement 424 and acknowledgement 452 may be referred to as a "Delayed-ACK", although the scope of the invention is not limited in this respect.

In some embodiments, access point 152 may poll WLAN node 254 by transmitting polling frame 426 at a beginning of uplink subframes 404. The use of polling frame 426 may help prevent collisions from occurring during transmission of delayed acknowledgement 452 from WLAN node 254. Polling frame 426 may cause other WLAN nodes, such as WLAN nodes 154 (FIG. 1) to refrain from transmitting when WLAN node 254 transmits delayed acknowledgement 452, although the scope of the invention is not limited in this respect.

One problem with some conventional WLANs, such as WLANs operating in accordance with one of the IEEE 802.11 standards discussed above is that an acknowledgement response is required to be sent back to the sending device almost immediately in response to receipt of data. When the sending device, such as wireless communication device 200, does not receive the acknowledgement, it may retransmit the data. When these conventional WLANs operate in the presence of a BWA network, the acknowledgement may not be able to be received properly when the sending device is concurrently transmitting during an uplink subframe of the BWA network. Some embodiments of the present invention may help overcome these problems associated with the operation of conventional WLANs in the presence of BWA networks by allowing WLAN devices to transmit data during either the uplink or downlink subframe and allowing the WLAN devices to wait a period of time (e.g., equaling the BWA network frame time) for receipt of the acknowledgement.

Figure 5:
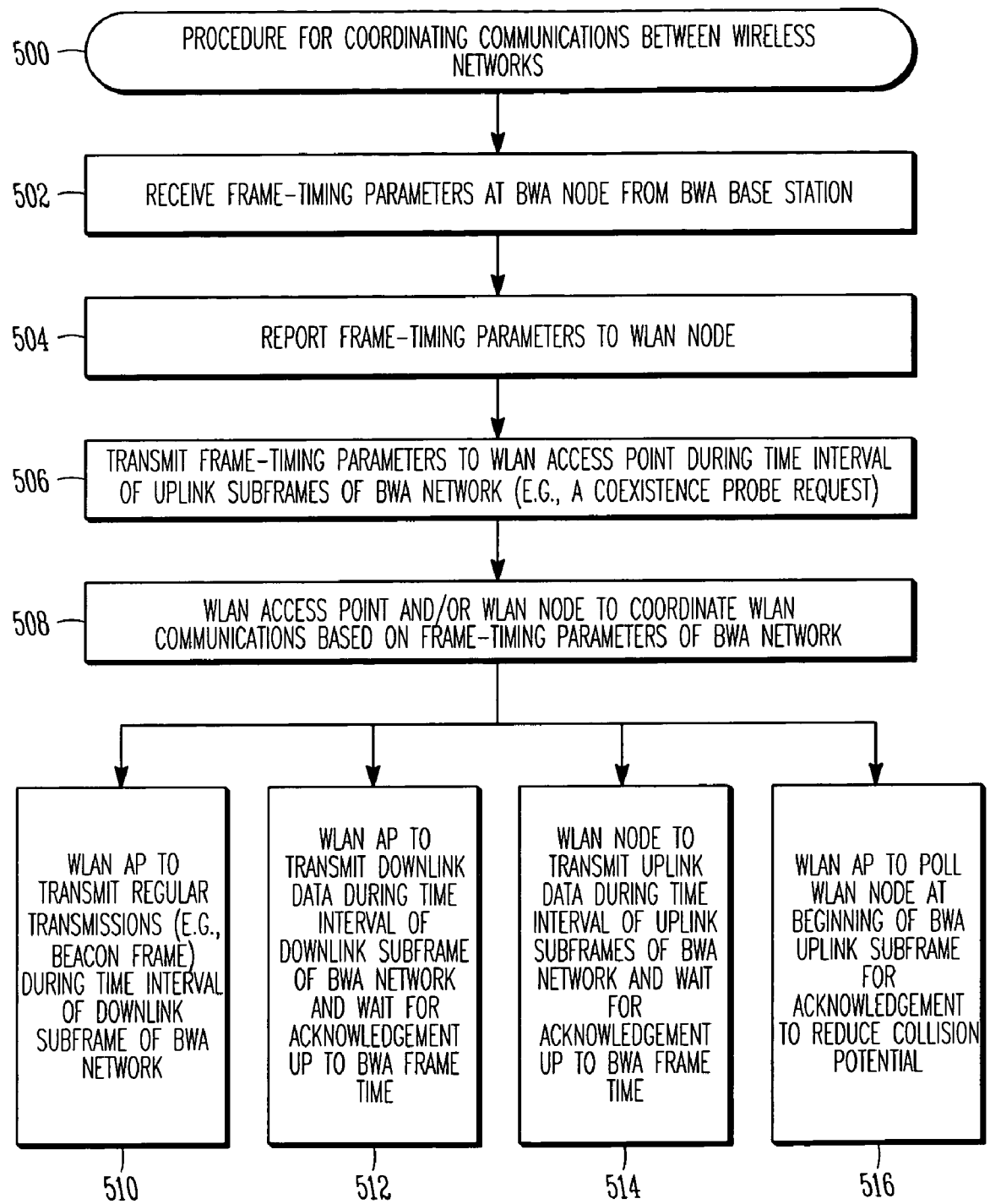
FIG. 5 is a flow chart of a procedure for coordinating communications between coexisting wireless networks in accordance with some embodiments of the present invention.

FIG. 5 is a flow chart of a procedure for coordinating communications between coexisting wireless networks in accordance with some embodiments of the present invention. Procedure 500 may be performed by one or more nodes of a WLAN, such as WLAN 150 (FIG. 1) when operating within a geographic region served by a BWA network, such as BWA network 100 (FIG. 1).

Operation 502 comprises receiving frame-timing parameters, such as frame-timing parameters 222 (FIG. 2), at a BWA network node, such as BWA network node 204 (FIG. 2), from a BWA network base station, such as base station 102 (FIG. 1).

Operation 504 comprises reporting the frame-timing parameters to a WLAN node, such as WLAN node 254 (FIG. 2). In some embodiments, the frame-timing parameters may be reported over an internal communication path, such as communication path 225 (FIG. 2), between the WLAN node and the BWA network node. In some alternate embodiments, a WLAN node may determine the frame-timing parameters by monitoring BWA network communications. In these embodiments, operations 502 and 504 may not need to be performed.

Operation 506 comprises transmitting the frame-timing parameters to a WLAN access point, such as WLAN access point 152 (FIG. 1), during a time interval of the uplink subframes, such as uplink subframes 304 (FIG. 3), of a BWA network. In some embodiments, the frame-timing parameters may be transmitted as part of coexistence probe request message 308 (FIG. 3), although the scope of the invention is not limited in this respect.

Operation 508 comprises the WLAN access point and/or the WLAN node coordinating WLAN communications based on the frame-timing parameters of the BWA network. Operation 508 may include performing any one or more of operations 510, 512, 514 and 516.

Operation 510 comprises the WLAN access point transmitting regular transmissions, such as beacon frames 310 (FIG. 3), during the time interval of the downlink subframes of the BWA network based on the frame-timing parameters.

Operation 512 comprises a WLAN access point transmitting downlink data, such as downlink data 422 (FIG. 4), during the time interval of downlink subframes of the BWA network. Operation 512 may also comprise the WLAN access point waiting for an acknowledgement from a WLAN node up to the BWA network frame time, which may include waiting the time intervals of the BWA network frame time which may, for example, equal downlink subframes 402 (FIG. 4) and the uplink subframes 404 (FIG. 4).

Operation 514 comprises a WLAN node transmitting uplink data to a WLAN access point during the time interval of the uplink subframes of the BWA network. Operation 514 may also comprise the WLAN node waiting for an acknowledgement from the WLAN access point up to the BWA network frame time.

Operation 516 comprises a WLAN access point polling a WLAN node at the beginning of an uplink subframe of the BWA network for acknowledgement of the transmitted data. This may help reduce collision potential of the acknowledgement. Because the acknowledgements are more likely to be received, retransmissions of the data may be reduced.

Although the individual operations of procedure 500 are illustrated and described as separate operations, one or more of the individual operations may be performed concurrently, and nothing requires that the operations be performed in the order illustrated. For example, operations 510, 512, 514 and 516 may be performed independently of each other.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Embodiments of the invention may be implemented in one or a combination of hardware, firmware and software. Embodiments of the invention may also be implemented as instructions stored on a computer-readable storage machine-readable medium, which may be read and executed by at least one processor to perform the operations described herein. A computer-readable storage machine-readable medium may include any mechanism for storing information in a form readable by a machine (e.g., a computer). For example, a computer-readable storage machine-readable medium may include read-only memory (ROM), random-access memory (RAM), magnetic disk storage media, optical storage media, flash-memory devices, and others other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A wireless communication device comprising: a broadband wireless access (BWA) network node for communicating within a BWA network; a wireless local area network (WLAN) node for communicating within a WLAN; and an internal communication path, the BWA network node to report frame-timing parameters related to the BWA network to the WLAN node, the WLAN node to transmit the frame-timing parameters to an access point of the WLAN, wherein a transmission time of a downlink transmission for receipt by the WLAN node is selected by the access point based on the frame-timing parameters to reduce potential interference caused by uplink transmissions to the BWA network by the BWA network node, wherein the WLAN node is to transmit the frame-timing parameters to the access point during a time interval of uplink subframes of the BWA network, the time interval of the uplink subframes to be determined from the frame-timing parameters, wherein the frame-timing parameters comprise at least one of a downlink subframe start time, an uplink subframe start time or a frame end time, wherein the BWA network node is to receive the frame-timing parameters from the BWA network, the frame-timing parameters to include frame-timing information for use by the BWA network node in communicating with the BWA network, and wherein the BWA network node is to provide the frame-timing parameters to the WLAN node over the internal communication path of the wireless communication device, the internal communication path comprising either a hardware-implemented or a software-implemented communication path.

2. The wireless communication device of claim 1 wherein the WLAN node is to transmit the frame-timing parameters to the access point as part of a coexistence probe request message.

3. The wireless communication device of claim 1 wherein in response to receipt of the frame-timing parameters from the WLAN node, the access point is to responsively change the transmission time for transmission of at least one or more regularly transmitted downlink transmissions to one or more WLAN nodes of the WLAN based on the frame-timing parameters so that the uplink transmissions to the BWA network from one or more other BWA network nodes of the BWA network including the uplink transmissions of the BWA network node do not interfere with the receipt of the one or more regularly transmitted downlink transmissions.

4. The wireless communication device of claim 1 wherein the downlink transmission comprises a beacon frame transmitted by the access point, the beacon frame to be transmitted on a periodic basis to provide communication parameters to one or more WLAN nodes of the WLAN for communicating with the access point, and wherein the access point transmits the beacon frame to coincide with a downlink subframe of the BWA network.

5. The wireless communication device of claim 1 wherein the WLAN node is to schedule uplink data transmissions to the access point during uplink subframes of the BWA network based on the frame-timing parameters, wherein the WLAN node is to wait at least a predetermined period of time for receipt of an acknowledgement from the access point, the acknowledgement to be scheduled for transmission by the access point during a downlink subframe of the BWA network based on the frame-timing parameters, and wherein the predetermined period of time comprises one or more of the uplink subframes and the downlink subframe.

6. The wireless communication device of claim 5 wherein the access point is to schedule downlink data transmissions to the WLAN node during a downlink subframe based on the frame-timing parameters, wherein the access point is to wait a predetermined period of time for receipt of an acknowledgement from the WLAN node, the acknowledgement to be scheduled for transmission by the WLAN node during the uplink subframes based on the frame-timing parameters, and wherein the access point is to poll the WLAN node by transmitting a polling frame at a beginning of the uplink subframes to help prevent collisions from occurring during transmission of the acknowledgement from the WLAN node.

7. The wireless communication device of claim 1 wherein the BWA network node and the WLAN node share a common platform, the common platform having one or more processing elements, memory and application level functionality shared by BWA network node and the WLAN node, and wherein the BWA network node and the WLAN node each have separate media-access control circuitry, physical level layer circuitry and antennas for communicating respectively with the BWA network and the WLAN.

8. The wireless communication device of claim 7 wherein the BWA network is a broadband wireless multiple access communication network in which uplink and downlink time-slots are assigned by a BWA network base station to one or more BWA network nodes for communicating with the BWA network base station in a multiple access manner, and
wherein the WLAN is a contention-based wireless communication network in which WLAN nodes contend for shared bandwidth to communicate with the access point.

9. A wireless communication device comprising: a broadband wireless access (BWA) network node for communicating within a BWA network; a wireless local area network (WLAN) node for communicating within a WLAN; and an internal communication path, the BWA network node to report frame-timing parameters related to the BWA network to the WLAN node, the WLAN node to transmit the frame-timing parameters to an access point of the WLAN,
wherein a transmission time of a downlink transmission for receipt by the WLAN node is selected by the access point based on the frame-timing parameters to reduce potential interference caused by uplink transmissions to the BWA network by the BWA network node,
wherein the BWA network node is to receive the frame-timing parameters from the BWA network, the frame-timing parameters to include frame-timing information for use by the BWA network node in communicating with the BWA network, and
wherein the BWA network node is to provide the frame-timing parameters to the WLAN node over the internal communication path of the wireless communication device, the internal communication path comprising either a hardware-implemented or a software-implemented communication path.

10. A method for operating a wireless communication device within a wireless local area network (WLAN) and a broadband wireless access (BWA) network comprising:
receiving, by a BWA network node, frame-timing parameters from the BWA network, the frame-timing parameters to include frame-timing information for use by the BWA network node in communicating with the BWA network;
reporting, by the BWA network node, the frame-timing parameters related to the BWA network to the WLAN node over an internal communication path of the wireless communication device; and
transmitting, by a WLAN node, the frame-timing parameters to an access point of the WLAN, the BWA network node and the WLAN node being co-located within the wireless communication device,
wherein a transmission time of a downlink transmission for receipt by the WLAN node is selected by the access point based on the frame-timing parameters to reduce potential interference caused by uplink transmissions to the BWA network by the BWA network node,
wherein transmitting comprises transmitting the frame-timing parameters to the access point during a time interval of uplink subframes of the BWA network, the time interval of the uplink subframes to be determined from the frame-timing parameters,
wherein the frame-timing parameters comprise at least one of a downlink subframe start time, an uplink subframe start time or a frame end time, and wherein the internal communication path comprises either a hardware-implemented or a software-implemented communication path.

11. The method of claim 10 wherein transmitting comprises transmitting, by the WLAN node, the frame-timing parameters to the access point as part of a coexistence probe request message.

12. The method of claim 10 wherein, in response to receipt of the frame-timing parameters from the WLAN node, the access point is to responsively change the transmission time for transmission of at least one or more regularly transmitted downlink transmissions to one or more WLAN node of the WLAN based on the frame-timing parameters so that the uplink transmissions to the BWA network from one or more other BWA network nodes of the BWA network including the uplink transmissions of the BWA network node do not interfere with the receipt of the one or more regularly transmitted downlink transmissions.

13. The method of claim 10 wherein the downlink transmission comprises a beacon frame transmitted by the access point, the beacon frame to be transmitted on a periodic basis to provide communication parameters to one or more WLAN nodes of the WLAN for communicating with the access point, and
wherein the access point transmits the beacon frame to coincide with a downlink subframe of the BWA network.

14. The method of claim 10 further comprising:
scheduling, by the WLAN node, uplink data transmissions to the access point during uplink subframes of the BWA network based on the frame-timing parameters; and
waiting, by the WLAN node, at least a predetermined period of time for receipt of an acknowledgement from the access point, the acknowledgement to be scheduled for transmission by the access point during a downlink subframe of the BWA network based on the frame-timing parameters,
wherein the predetermined period of time comprises one or more of the uplink subframes and the downlink subframe.

15. The method of claim 14 wherein the access point is to schedule downlink data transmissions to the WLAN node during a downlink subframe based on the frame-timing parameters,
wherein the access point is to wait a predetermined period of time for receipt of an acknowledgement from the WLAN node, the acknowledgement to be scheduled for transmission by the WLAN node during the uplink subframes based on the frame-timing parameters, and
wherein the access point is to poll the WLAN node by transmitting a polling frame at a beginning of the uplink subframes to help prevent collisions from occurring during transmission of the acknowledgement from the WLAN node.

16. The method of claim 10 wherein the BWA network node and the WLAN node share a common platform, the common platform having one or more processing elements, memory and application level functionality shared by BWA network node and the WLAN node, and
wherein the BWA network node and the WLAN node each have separate media-access control circuitry, physical level layer circuitry and antennas for communicating respectively with the BWA network and the WLAN.

17. The method of claim 16 wherein the BWA network is a broadband wireless multiple access communication network in which uplink and downlink time-slots are assigned by a BWA network base station to one or more BWA network nodes for communicating with the BWA network base station in a multiple access manner, and wherein the WLAN is a contention-based wireless communication network in which WLAN nodes contend for shared bandwidth to communicate with the access point.

18. A system comprising:

one or more substantially omnidirectional antennas; and a broadband wireless access (BWA) network node coupled to one of the antennas for communicating within a BWA network and a wireless local area network (WLAN) node coupled to one of the antennas for communicating within a WLAN, the BWA network node to report frame-timing parameters related to the BWA network to the WLAN node, and the WLAN node to transmit the frame-timing parameters to an access point of the WLAN, wherein a transmission time of a downlink transmission for receipt by the WLAN node is selected by the access point based on the frame-timing parameters to reduce potential interference caused by uplink transmissions to the BWA network by the BWA network node, wherein the WLAN node is to transmit the frame-timing parameters to the access point during a time interval of uplink subframes of the BWA network, the time interval of the uplink subframes to be determined from the frame-timing parameters, wherein the frame-timing parameters comprise at least one of a downlink subframe start time, an uplink subframe start time or a frame end time, wherein the BWA network node is to receive the frame-timing parameters from the BWA network, the frame-timing parameters to include frame-timing information for use by the BWA network node in communicating with the BWA network, and wherein the BWA network node is to provide the frame-timing parameters to the WLAN node over the internal communication path of the wireless communication device, the internal communication path comprising either a hardware-implemented or a software-implemented communication path.

19. The system of claim 18 wherein the access point is to schedule downlink data transmissions to the WLAN node during a downlink subframe based on the frame-timing parameters, and wherein the access point is to wait a predetermined period of time for receipt of an acknowledgement from the WLAN node, the acknowledgement to be scheduled for transmission by the WLAN node during the uplink subframes based on the frame-timing parameters.

20. A computer-readable storage medium that stores instructions for execution by one or more processors to perform operations for operating a wireless communication device within a wireless local area network (WLAN) and a broadband wireless access (BWA) network, wherein the operations comprise:

receiving, by a BWA network node, frame-timing parameters from the BWA network, the frame-timing parameters to include frame-timing information for use by the BWA network node in communicating with the BWA network;

reporting, by a BWA network node, the frame-timing parameters related to the BWA network to the WLAN node over an internal communication path of the wireless communication device; and transmitting, by a WLAN node, the frame-timing parameters to an access point of the WLAN, the BWA network node and the WLAN node being co-located within the wireless communication device, wherein a transmission time of a downlink transmission for receipt by the WLAN node is selected by the access point based on the frame-timing parameters to reduce potential interference caused by uplink transmissions to the BWA network by the BWA network node, wherein transmitting comprises transmitting the frame-timing parameters to the access point during a time interval of uplink subframes of the BWA network, the time interval of the uplink subframes to be determined from the frame-timing parameters, wherein the frame-timing parameters comprise at least one of a downlink subframe start time, an uplink subframe start time or a frame end time, and wherein the internal communication path comprises either a hardware-implemented or a software-implemented communication path.

21. The computer-readable storage medium of claim 20 wherein the operations further comprises:

scheduling, by the WLAN node, uplink data transmissions to the access point during uplink subframes of the BWA network based on the frame-timing parameters; and waiting, by the WLAN node, at least a predetermined period of time for receipt of an acknowledgement from the access point, the acknowledgement to be scheduled for transmission by the access point during a downlink subframe of the BWA network based on the frame-timing parameters, wherein the predetermined period of time comprises one or more of the uplink subframes and the downlink subframe.

* * * * *

UNITED STATES PATENT AND TRADEMARK OFFICE
CERTIFICATE OF CORRECTION

PATENT NO. : 7,664,085 B2  Page 1 of 1
APPLICATION NO. : 11/322465
DATED : February 16, 2010
INVENTOR(S) : Shai Waxman It is certified that error appears in the above-identified patent and that said Letters Patent is hereby corrected as shown below:

On Title page, in Item (57), under "Abstract", in column 2, line 8, delete "ad" and insert -- of --, therefor.

In column 14, line 37, in Claim 21, delete "comprises:" and insert -- comprise: --, therefor.

Signed and Sealed this

Twenty-seventh Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,664,085 B2 Page 1 of 1
APPLICATION NO. : 11/322465
DATED : February 16, 2010
INVENTOR(S) : Shai Waxman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1084 days.

Signed and Sealed this

Twenty-eighth Day of December, 2010

David J. Kappos
*Director of the United States Patent and Trademark Office*